(12) United States Patent
Kawakita et al.

(10) Patent No.: US 12,002,945 B2
(45) Date of Patent: Jun. 4, 2024

(54) POSITIVE ELECTRODE ACTIVE MATERIAL FOR NON-AQUEOUS ELECTROLYTE SECONDARY BATTERY, POSITIVE ELECTRODE FOR NON-AQUEOUS ELECTROLYTE SECONDARY BATTERY, AND NON-AQUEOUS ELECTROLYTE SECONDARY BATTERY

(71) Applicant: Panasonic Intellectual Property Management Co., Ltd., Osaka (JP)

(72) Inventors: Akihiro Kawakita, Osaka (JP); Takeshi Ogasawara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 864 days.

(21) Appl. No.: 17/044,609

(22) PCT Filed: Feb. 26, 2019

(86) PCT No.: PCT/JP2019/007295
§ 371 (c)(1),
(2) Date: Oct. 1, 2020

(87) PCT Pub. No.: WO2019/193874
PCT Pub. Date: Oct. 10, 2019

(65) Prior Publication Data
US 2021/0104736 A1 Apr. 8, 2021

(30) Foreign Application Priority Data
Apr. 6, 2018 (JP) ................................ 2018-074110

(51) Int. Cl.
*H01M 4/36* (2006.01)
*C01G 53/00* (2006.01)
(Continued)

(52) U.S. Cl.
CPC ............ *H01M 4/364* (2013.01); *C01G 53/00* (2013.01); *H01M 4/131* (2013.01); *H01M 4/382* (2013.01);
(Continued)

(58) Field of Classification Search
None
See application file for complete search history.

(56) References Cited

U.S. PATENT DOCUMENTS

2017/0012289 A1* 1/2017 Kawakita .............. H01M 4/624
2017/0054147 A1* 2/2017 Yokoyama .............. H01M 4/36

FOREIGN PATENT DOCUMENTS

| JP | 2008-226495 A | 9/2008 |
|---|---|---|
| JP | 2015-144108 A | 8/2015 |

(Continued)

OTHER PUBLICATIONS

Second and Supplementary Notice Informing the Applicant of the Communication of the International Application (Forms PCT/IB/308) issued in counterpart International Application No. PCT/JP2019/007295 dated Aug. 6, 2020 with Forms PCT/IB/373, PCT/IB/326 and PCT/IB/237. (12 pages).

(Continued)

*Primary Examiner* — Eli S Mekhlin
(74) *Attorney, Agent, or Firm* — WHDA, LLP

(57) ABSTRACT

A lithium-containing complex transition metal oxide forming the positive electrode active material of a non-aqueous electrolyte secondary cell in one embodiment is a secondary particle obtained by aggregating primary particles. Ion chromatography analysis of a sample obtained by adding the positive electrode active material to an alkali solution and absorbing a distillate thereof in sulfuric acid results in detection of 2-200 pm of ammonia relative to the mass of the positive electrode active material. When a filtrate of an (Continued)

aqueous dispersion in which 1 g of the positive electrode active material is dispersed in 70 ml of pure water is titrated with hydrochloric acid, the value of Y−X is 50-300 mol/g and the value of X−(Y−X) is no higher than 150 mol/g, with X mol/g being the acid consumption until a first inflection point on the pH curve and Y mol/g being the acid consumption until a second inflection point.

6 Claims, 1 Drawing Sheet

(51) Int. Cl.
  *H01M 4/131* (2010.01)
  *H01M 4/38* (2006.01)
  *H01M 4/485* (2010.01)
  *H01M 4/52* (2010.01)
  *H01M 4/525* (2010.01)

(52) U.S. Cl.
  CPC ........... *H01M 4/485* (2013.01); *H01M 4/523* (2013.01); *H01M 4/525* (2013.01); *H01M 2300/0017* (2013.01)

(56) References Cited

FOREIGN PATENT DOCUMENTS

| | | |
|---|---|---|
| JP | 2015-181113 A | 10/2015 |
| JP | 2015-216105 A | 12/2015 |
| WO | 2015/125444 A1 | 8/2015 |

OTHER PUBLICATIONS

International Search Report dated Jun. 4, 2019, issued in counterpart International Application No. PCT/JP2019/007295, with English Translation. (5 pages).

* cited by examiner

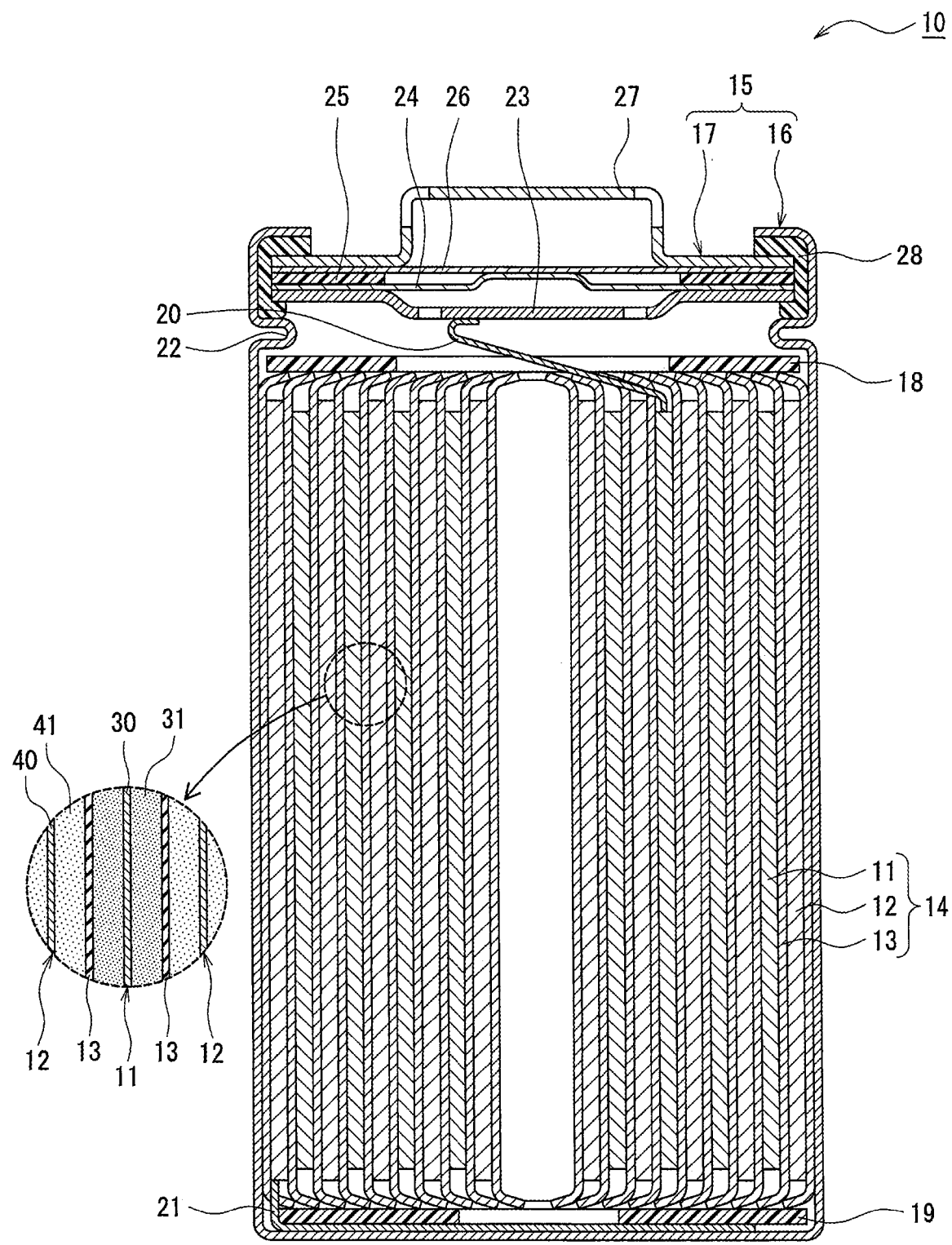

POSITIVE ELECTRODE ACTIVE MATERIAL FOR NON-AQUEOUS ELECTROLYTE SECONDARY BATTERY, POSITIVE ELECTRODE FOR NON-AQUEOUS ELECTROLYTE SECONDARY BATTERY, AND NON-AQUEOUS ELECTROLYTE SECONDARY BATTERY

TECHNICAL FIELD

The present disclosure relates to a positive electrode active material of a non-aqueous electrolyte secondary battery, a positive electrode for a non-aqueous electrolyte secondary battery, and a non-aqueous electrolyte secondary battery.

BACKGROUND ART

Lithium-containing transition metal composite oxides that constitute positive electrode active materials of non-aqueous electrolyte secondary batteries are synthesized by mixing lithium compounds and transition metal compounds and firing the mixture. Some lithium elements are volatilized and lost during the firing and therefore it is common to use lithium in an amount higher than the stoichiometric ratio of the intended product. However, excess lithium present on the surface of the particles of the composite oxide increases the amount of gas generated at charging and storing the battery, and therefore it is necessary to wash the fired product with water to remove the excess lithium.

For example, Patent Literature 1 discloses a positive electrode active material in which fine particles including tungsten and lithium are attached to the surface of particles of a lithium-containing transition metal composite oxide. Patent Literature 1 discloses a step of washing the composite oxide particles with water, filtering, and drying.

CITATION LIST

Patent Literature

Patent Literature 1: Japanese Unexamined Patent Application Publication No. 2015-216105

SUMMARY

Technical Problem

If the washing of lithium-containing transition metal composite oxide with water can be omitted, the filtering and drying steps will be unnecessary, allowing reduction of the production cost of the positive electrode active material, reduction of the environmental load, and the like. The object of the present disclosure is to provide a positive electrode active material that can suppress the amount of gas generated, for example, at charging and storing a battery without washing a lithium-containing transition metal composite oxide with water.

Solution to Problem

The positive electrode active material of the non-aqueous electrolyte secondary battery according to one aspect of the present disclosure is a positive electrode active material of a non-aqueous electrolyte secondary battery including a lithium-containing transition metal composite oxide, wherein the lithium-containing transition metal composite oxide is secondary particles formed by aggregation of primary particles; when the positive electrode active material is added to an alkaline solution and then distilled, and the distillate is absorbed by sulfuric acid and subjected to ion chromatographic analysis, ammonia is detected in an amount of 2 to 200 ppm relative to the positive electrode active material; and when the filtrate of an aqueous dispersion prepared by dispersing 1 g of the positive electrode active material in 70 ml of pure water is titrated with hydrochloric acid, and the acid consumption up to the first inflection point of the pH curve is defined as X mol/g and the acid consumption up to the second inflection point is defined as Y mol/g, the value of Y−X is 50 to 300 mol/g and the value of X−(Y−X) is 150 mol/g or less.

A positive electrode for a non-aqueous electrolyte secondary battery according to one aspect of the present disclosure has a positive electrode mixture layer including the above positive electrode active material. In addition, the non-aqueous electrolyte secondary battery according to one aspect of the present disclosure comprises the positive electrode, a negative electrode, a separator, and a non-aqueous electrolyte.

Advantageous Effects of Invention

According to one aspect of the present disclosure, a non-aqueous electrolyte secondary battery using a positive electrode active material without water washing can reduce the amount of gas generated, for example, at charging and storing.

BRIEF DESCRIPTION OF DRAWING

FIG. 1 is a sectional view of a non-aqueous electrolyte secondary battery according to an example of the embodiment.

DESCRIPTION OF EMBODIMENTS

As described above, a non-aqueous electrolyte secondary battery using a positive electrode active material without water washing has an important issue to reduce the amount of gas generated, for example, at charging and storing. The present inventors have found that the gas generation is greatly suppressed by using a positive electrode active material in which ammonia detected by the above analysis method is 2 to 200 ppm with respect to the positive electrode active material, the above value of the acid consumption Y−X is 50 to 300 mol/g, and X−(Y−X) is 150 mol/g or less. Hereinafter, an example of the embodiment of the present disclosure will be described in detail with reference to the drawing.

Hereinafter, a cylindrical battery in which a wound electrode assembly 14 is housed in a cylindrical battery case is exemplified, but the electrode assembly is not limited to the wound type, and may be a laminate in which a plurality of positive electrodes and a plurality of negative electrodes are alternately laminated via a separator. In addition, the non-aqueous electrolyte secondary battery according to the present disclosure may be a rectangular battery having a rectangular metal case, a coin battery having a coin-shaped metal case, or the like, and a laminated battery including an exterior body being composed of a laminate sheet including a metal layer and a resin layer. In the present description, notation of the numerical value (A) to the numerical value (B) means the numerical value (A) or more and the numerical value (B) or less, unless otherwise specified.

FIG. 1 is a sectional view of a non-aqueous electrolyte secondary battery 10 according to an example of the embodiment. As illustrated in FIG. 1, the non-aqueous electrolyte secondary battery 10 includes an electrode assembly 14, a non-aqueous electrolyte (not shown), and a battery case 15 that houses the electrode assembly 14 and the non-aqueous electrolyte. The electrode assembly 14 includes a positive electrode 11, a negative electrode 12, and a separator 13, and has a wound structure in which the positive electrode 11 and the negative electrode 12 are wound via the separator 13. A battery case 15 is composed of a bottomed cylindrical exterior can 16 and a sealing assembly 17 that closes the opening of the exterior can 16.

The non-aqueous electrolyte secondary battery 10 includes insulating plates 18 and 19 arranged above and below the electrode assembly 14, respectively. In the example shown in FIG. 1, a positive electrode lead 20 attached to the positive electrode 11 extends to the side of the sealing assembly 17 through the through hole of the insulating plate 18, and a negative electrode lead 21 attached to the negative electrode 12 extends to the bottom side of the exterior can 16 through the outside of the insulating plate 19. The positive electrode lead 20 is connected to the lower surface of a filter 23, which is a bottom plate of the sealing assembly 17, by welding or the like, and a cap 27, which is a top plate of the sealing assembly 17 electrically connected to the filter 23, serves as a positive electrode terminal. The negative electrode lead 21 is connected to the inner surface of bottom of the exterior can 16 by welding or the like, and the exterior can 16 serves as a negative electrode terminal.

The exterior can 16 is, for example, a metal container with a bottomed cylindrical shape. A gasket 28 is provided between the exterior can 16 and the sealing assembly 17 to ensure the sealability inside the battery. The exterior can 16 has, for example, a projecting portion 22 for supporting the sealing assembly 17, in which a part of the side surface of the exterior can 16 protrudes inward. The projecting portion 22 is preferably formed in an annular shape along the circumferential direction of the exterior can 16, and the sealing assembly 17 is supported on the upper surface thereof.

The sealing assembly 17 has a structure in which a filter 23, a lower vent member 24, an insulating member 25, an upper vent member 26, and a cap 27 are laminated in this order from the electrode assembly 14 side. Each member constituting the sealing assembly 17 has a disk shape or ring shape, for example, and each member except the insulating member 25 is electrically connected each other. The lower vent member 24 and the upper vent member 26 are connected together at their respective central portions, and the insulating member 25 is interposed between the respective peripheral portions. When the internal pressure of the battery rises due to abnormal heat generation, the lower vent member 24 is deformed and broken so as to push the upper vent member 26 toward the cap 27 side, and the current path between the lower vent member 24 and the upper vent member 26 is blocked. When the internal pressure further rises, the upper vent member 26 is broken and gas is discharged from the opening of the cap 27.

[Positive Electrode]

The positive electrode 11 has a positive electrode current collector 30 and a positive electrode mixture layer 31 provided on the positive electrode current collector 30. As the positive electrode current collector 30, a foil of a metal stable in the potential range of the positive electrode 11 such as aluminum or aluminum alloy, a film in which the metal is disposed on the surface, or the like can be used. The positive electrode mixture layer 31 includes a positive electrode active material, a conductive agent, and a binder, and is preferably provided on both surfaces of the positive electrode current collector 30. The positive electrode 11 can be produced, for example, by applying a positive electrode mixture slurry on the positive electrode current collector 30, drying the coating film, and then compressing to form the positive electrode mixture layer 31 on both surfaces of the positive electrode current collector 30.

A positive electrode active material includes a lithium-containing transition metal composite oxide and is formed mainly of the composite oxide. The lithium-containing transition metal composite oxide forming the positive electrode active material is secondary particles formed by aggregation of primary particles. For the positive electrode active material, when the active material is added to an alkaline solution and then distilled, and the distillate is absorbed by sulfuric acid and subjected to ion chromatographic analysis, ammonia is detected in an amount of 2 to 200 ppm relative to the mass of the positive electrode active material. In addition, when the filtrate of an aqueous dispersion prepared by dispersing 1 g of the positive electrode active material in 70 ml of pure water is titrated with hydrochloric acid, and the acid consumption up to the first inflection point of the pH curve is defined as X mol/g and the acid consumption up to the second inflection point is defined as Y mol/g, the value of Y−X is 50 to 300 mol/g and the value of X−(Y−X) is 150 mol/g or less. As described above, using the positive electrode active material can reduce the amount of gas generated, for example, at charging and storing a battery, without washing with water after firing. On the surface of the primary particles constituting the lithium-containing transition metal composite oxide, for example, an ammonium compound of 2 to 200 ppm relative to the mass of the composite oxide is present.

The positive electrode mixture layer 31 may include, in a range that does not impair the object of the present disclosure, a composite oxide (positive electrode active material) in which an ammonium compound does not exist on the particle surface, a positive electrode active material in which the value of the above acid consumption Y−X falls outside the range of 50 to 300 mol/g, or the like. The content of the positive electrode active material in which an ammonium compound of 2 to 200 ppm is present on the particle surface of the lithium-containing transition metal composite oxide, the value of Y−X described above is 50 to 300 mol/g, and the value of X−(Y−X) described above is 150 mol/g or less is preferably 50 to 100% by mass, more preferably 80 to 100% by mass, relative to the total mass of the positive electrode active material.

The lithium-containing transition metal composite oxide that constitutes the positive electrode active material contains at least one transition metal element of Ni, Co, and Mn. The composite oxide may contain a metal element other than Li, Ni, Co, and Mn. Examples of other metal elements include Al, Na, Mg, Sc, Zr, Ti, V, Ga, In, Ta, W, Sr, Y, Fe, Cu, Zn, Cr, Pb, Sb, and B. An example of a suitable lithium-containing transition metal composite oxide includes a composite oxide containing Ni, Co, and Mn and a composite oxide containing Ni, Co, and Al.

The above lithium-containing transition metal composite oxide preferably contains Ni in an amount of 80% or more relative to the total number of moles of metal elements excluding Li. The proportion of Ni of 80 mol % or more can increase the capacity of the battery. The content of Ni is, for example, 80 to 95 mol %. Specific examples of the suitable lithium-containing transition metal composite oxide include composite oxides represented by the general formula of $Li_xNi_{1-y-z}Co_yM_zO_2$, wherein $0.9 \leq x \leq 1.2$, $0.05 \leq y+z \leq 0.2$, and M is one or more metal elements containing at least one of Mn and Al.

The BET specific surface area of the above lithium-containing transition metal composite oxide is preferably 0.9 $m^2/g$ or less, and more preferably 0.8 $m^2/g$ or less. The BET specific surface area of the composite oxide is, for example, 0.5 to 0.8 $m^2/g$. The BET specific surface area is measured according to the BET method described in JIS R1626. Specifically, the BET nitrogen adsorption isotherm of the dried composite oxide particles was measured by using an automatic specific surface area/pore distribution measuring device (Autosorb iQ3-MP, manufactured by Quantachrome Co., Ltd.), and the specific surface area is calculated from the nitrogen adsorption amount by using the BET multipoint method.

The volume-based median diameter of the above lithium-containing transition metal composite oxide (secondary particles) is not particularly limited, but is preferably 2 to 15 μm, and more preferably 6 to 13 μm. The median diameter of the composite oxide is a particle diameter at which the volume integrated value is 50% in the particle size distribution measured by using a laser diffraction/scattering particle size distribution measuring device (MT3000II, manufactured by Microtrac Bell Co., Ltd.). The particle size of the primary particles constituting the secondary particles is, for example, 0.05 to 1 μm. The particle size of primary particles is measured as the maximum crossover length in a particle image observed by a scanning electron microscope (SEM).

As described above, for the positive electrode active material including the above lithium-containing transition metal composite oxide, when the filtrate of an aqueous dispersion prepared by dispersing 1 g of the active material in 70 ml of pure water is titrated with hydrochloric acid, and the acid consumption up to the first inflection point of the pH curve is defined as X mol/g and the acid consumption up to the second inflection point is defined as Y mol/g, the value of Y–X is 50 to 300 mol/g and the value of X–(Y–X) is 150 mol/g or less. That is, the positive electrode active material includes a water-soluble alkaline component to be titrated with the acid. The value of Y–X is preferably 70 to 250, and more preferably 80 to 220. The value of X–(Y–X) is preferably 80 or less, and more preferably 50 or less.

The positive electrode active material includes an alkaline component in an amount corresponding to the above acid consumption. Examples of the alkaline component include lithium hydroxide (LiOH) and lithium carbonate ($Li_2CO_3$). In addition, the positive electrode active material includes an ammonium compound of 2 to 200 ppm in terms of ammonia molecule. The ammonium compound is, for example, ammonia and ammonium salt. Lithium carbonate, lithium hydroxide, and the ammonium compound may be present on the interface of each primary particle and on the surface of the secondary particles formed by aggregation of the primary particles in the particles of the composite oxide. Preferably, these are uniformly present without being unevenly present on a part of the surface of the primary particles.

The specific method for quantifying the water-soluble alkaline component extracted from the positive electrode active material is as follows. The following titration method is generally called the Warder method.
(1) One (1) g of a positive electrode active material is added to 30 ml of pure water and stirred to prepare a suspension in which the active material is dispersed in water.
(2) The suspension is filtered and filled up to 70 ml with pure water to obtain a filtrate including a water-soluble alkaline component eluted from the active material.
(3) While measuring the pH of the filtrate, hydrochloric acid was added dropwise to the filtrate little by little to determine the amount (titration amount) of hydrochloric acid consumed up to the first inflection point (around pH 8) of the pH curve, X mol/g, and the amount of hydrochloric acid consumed up to the second inflection point (around pH 4), Y mol/g. The inflection point is the peak position of the differential value relative to the titration amount.

The amount of the ammonium compound present on the surface of the primary particles can be quantified by ion chromatographic analysis. The specific measuring method is as follows.
(1) One (1) g of a positive electrode active material is transferred to a distillation flask and added with 300 ml of pure water.
(2) The aqueous dispersion of the above positive electrode active material is added with 10 ml of an aqueous solution of sodium hydroxide (30%) to make an alkaline solution, is then added with boiling stone, and is distilled.
(3) The solution obtained by boiling and evaporation is cooled and collected, is added to 40 ml of sulfuric acid (25 mmol/L), and is filled up to 200 ml with pure water to prepare a sample solution.
(4) The sample solution was subjected to ion chromatography, and the amount of detected ammonium ion was converted into the amount of ammonia in the sample.

At least one surface coating material selected from a zirconium compound, a tungsten compound, a phosphorus compound, a boron compound, and a rare earth compound may be attached to the surface of the primary particles of the lithium-containing transition metal composite oxide. The surface coating material is attached to at least one of inside of the particles of the composite oxide, that is, the surface of the primary particles existing inside the secondary particles, and of the surface of the particles of the composite oxide, that is, the surface of the primary particles existing on the surface of the secondary particles (the surface of the secondary particles). The surface coating material, when present, suppresses the generation of gas, for example, at charging and storing without causing problems such as capacity reduction. Preferably, the surface coating material is uniformly present without being unevenly present on a part of the surface of the primary particles. In addition, the content thereof is preferably 0.01 to 0.5 mol % in terms of the metal element constituting the compound, relative to the total number of moles of the metal elements excluding Li in the lithium-containing transition metal composite oxide.

Zirconium compounds, tungsten compounds, phosphorus compounds, boron compounds, and rare earth compounds may be any of oxides, nitrides, and hydroxides. Specific examples include zirconium oxide, tungsten oxide, lithium tungstate, lithium phosphate, boron oxide, lithium tetraborate, samarium hydroxide, erbium hydroxide, samarium oxide, and erbium oxide. Attachment of these compounds to the surface of the primary particles being present inside of or on the surface of the secondary particles, and the content in terms of metal elements can be observed and measured by using a scanning electron microscope (SEM) and an inductively coupled plasma (ICP) emission spectroscopy analyzer, respectively.

The above lithium-containing transition metal composite oxide is produced through, for example, the first step of synthesizing a transition metal composite hydroxide containing Ni, Co, Mn, Al, and the like by a coprecipitation method, the second step of oxidizing and roasting the composite hydroxide to obtain a transition metal composite oxide, and the third step of mixing and firing the composite oxide and lithium hydroxide. The lithium-containing transition metal composite oxide obtained in the third step may be washed with water, but is preferably used substantially without washing with water.

In the third step, the above mixture is fired at a temperature more than 700° C. The preferable range of the firing temperature is 700 to 900° C. The firing is preferably performed in an oxygen stream. In the third step, a lithium source (lithium hydroxide) in excess of the stoichiometric ratio of the intended product is used in terms of discharge capacity. For example, 1 to 1.1 times of the composite oxide in terms of the stoichiometric ratio is preferable.

The production step of the above lithium-containing transition metal composite oxide preferably further includes the fourth step of adding a compound to be an ammonia source and a compound to be a carbonic acid source. In the fourth step, a compound to be an ammonia source and a carbonic acid source, such as ammonium carbonate, may be added. In the fourth step, an aqueous solution of ammonium carbonate or the like is dropped or sprayed to the lithium-containing transition metal composite oxide without washing with water, and then heat treatment is performed at a temperature lower than the firing temperature of the third step. An example of heat treatment conditions is a temperature of 200 to 500° C. and a heating time of 1 to 4 hours. Excess Li is present on the surface of the particles of the lithium-containing transition metal composite oxide without washing with water, and therefore lithium carbonate and an ammonium compound are produced, for example, when ammonium carbonate is added to the surface of the particles.

The conductive agent included in the positive electrode mixture layer 31 adheres to the surface of the particles of the positive electrode active material and also adheres to the surface of the positive electrode current collector 30 to form a conductive path in the positive electrode mixture layer 31. Examples of the conductive agent include carbon materials such as carbon black, acetylene black, Ketjen black, and graphite. The content of the conductive agent in the positive electrode mixture layer 31 is, for example, 1 to 10% relative to the total mass of the positive electrode mixture layer 31.

Examples of the binder included in the positive electrode mixture layer 31 include: fluororesins such as polytetrafluoroethylene (PTFE) and polyvinylidene fluoride (PVdF); polyacrylonitrile (PAN); polyimide; acrylic resin; and polyolefins. Among them, fluororesins such as PTFE and PVdF are preferable, and PVdF is particularly preferable. The content of the binder in the positive electrode mixture layer 31 is, for example, 0.5 to 5% relative to the total mass of the positive electrode mixture layer 31.

[Negative Electrode]

The negative electrode 12 has a negative electrode current collector 40 and a negative electrode mixture layer 41 provided on the current collector. As the negative electrode current collector 40, a foil of a metal stable in the potential range of the negative electrode 12 such as copper or copper alloy, a film in which the metal is disposed on the surface, or the like can be used. The negative electrode mixture layer 41 includes a negative electrode active material and a binder, and is preferably provided on both surfaces of the negative electrode current collector 40. The negative electrode 12 can be produced by applying a negative electrode mixture slurry including the negative electrode active material and the binder on the negative electrode current collector 40, drying the coating film, and then rolling to form the negative electrode mixture layer 41 on both surfaces of the negative electrode current collector 40.

The negative electrode active material is not particularly limited as long as it can reversibly intercalate and deintercalate lithium ions, and a carbon material such as graphite is generally used. The graphite may be any of natural graphite such as flake graphite, lump graphite, and earth graphite and artificial graphite such as lump artificial graphite and graphitized mesophase carbon microbeads. In addition, as the negative electrode active material, metals such as Si and Sn that are alloyed with Li, metal compounds including Si and Sn, and lithium titanium composite oxides may be used. For example, a silicon compound represented by $SiO_x$ ($0.5 \leq x \leq 1.6$) or a silicon compound represented by $Li_{2y}SiO_{(2+y)}$ ($0<y<2$) may be used in combination with a carbon material such as graphite.

As a binder included in the negative electrode mixture layer 41, fluorine-containing resin such as PTFE and PVdF, PAN, polyimide, acrylic resin, and polyolefins may be used as in the case of the positive electrode 11, but styrene-butadiene rubber (SBR) is preferably used. In addition, the negative electrode mixture layer 41 may include CMC or a salt thereof, polyacrylic acid (PAA) or a salt thereof, PVA, or the like. The negative electrode mixture layer 41 includes, for example, SBR and CMC or a salt thereof.

[Separator]

As a separator 13, a porous sheet having ion permeability and insulating property is used. Specific examples of the porous sheet include a microporous thin film, a woven fabric, and a non-woven fabric. As the material of the separator, polyolefins such as polyethylene and polypropylene, cellulose, and the like are suitable. The separator 13 may have a single-layer structure or a laminated structure. In addition, on the surface of the separator 13, a resin layer having high heat resistance such as an aramid resin or a filler layer including a filler of an inorganic compound may be provided.

[Non-Aqueous Electrolyte]

A non-aqueous electrolyte includes a non-aqueous solvent and an electrolyte salt dissolved in a non-aqueous solvent. As a non-aqueous solvent, for example, esters, ethers, nitriles such as acetonitrile, amides such as dimethylformamide, and two or more of these mixed solvents can be used. The non-aqueous solvent may contain a halogen substitute in which at least a part of hydrogen of these solvents is substituted with a halogen atom such as fluorine. Examples of the halogen substitute include: fluorinated cyclic carbonates such as fluoroethylene carbonate (FEC); fluorinated linear carbonate; and fluorinated linear carboxylic acid esters such as methyl fluoropropionate (FMP).

Examples of the above esters include cyclic ester carbonates such as ethylene carbonate (EC), propylene carbonate (PC), and butylene carbonate; linear ester carbonates such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylic acid esters such as γ-butyrolactone (GBL) and γ-valerolactone (GVL); and linear carboxylic acid esters such as methyl acetate, ethyl acetate, propyl acetate, methyl propionate (MP), and ethyl propionate.

Examples of the above ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methyl furan, 1,8-cineole, and crown ether; and linear ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

An electrolyte salt is preferably a lithium salt. Examples of the lithium salt include: $LiBF_4$, $LiCl_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(CnF_{2n+1})_x$ (1<x<6, n is 1 or 2), $LiB_{10}Cl_{10}$, LiCl, LiBr, LiI, chloroborane lithium, lower aliphatic carboxylic acid lithium, borates such as $Li_2B_4O_7$ and $Li(B(C_2O_4)F_2)$; and imide salts such as $LiN(SO_2CF_3)_2$ and $LiN(C_1F_{2l+1}SO_2)(C_mF_{2m+1}SO_2)$ (l and m are each an integer of 0 or more). These lithium salts may be used singly or two or more thereof may be mixed and used. Among them, $LiPF_6$ is preferably used from the viewpoints such as ion conductivity and electrochemical stability. The concentration of the lithium salt is, for example, 0.8 mol to 1.8 mol per 1 L of a non-aqueous solvent.

EXAMPLES

Hereinafter, the present disclosure will be further described with reference to Examples, but the present disclosure is not intended to be limited to the following Examples.

Example 1

[Preparation of Positive Electrode Active Material]

The nickel-cobalt-aluminum composite hydroxide obtained by the coprecipitation method was oxidized and roasted to synthesize a composite oxide represented by $Ni_{0.91}Co_{0.045}Al_{0.045}O$. The composite oxide and LiOH were mixed at a molar ratio of 1:1.02, and the mixture was fired at 800° C. for 3 hours under an oxygen stream to obtain a lithium-containing transition metal composite oxide (fired product). The fired product was secondary particles formed by aggregation of primary particles. The aqueous solution of ammonium carbonate was sprayed on the fired product without washing with water and then heated at 200° C. for 3 hours to obtain a positive electrode active material. The above acid consumption, Y–X and X–(Y–X) per 1 g of the positive electrode active material were determined by the above Warder method, and the amount of ammonia was determined by the above chromatographic analysis. The conditions for spraying the aqueous solution of ammonium carbonate were adjusted so that these values would be the values shown in Table 1 below (the same applies hereinafter).

[Production of Positive Electrode]

The above positive electrode active material, acetylene black, and PVdF were mixed in a solid content mass ratio of 100:1:1, and an appropriate amount of N-methyl-2-pyrrolidone (NMP) was added to prepare a positive electrode mixture slurry. Subsequently, the positive electrode mixture slurry was applied to both surfaces of a positive electrode current collector being composed of aluminum foil, the coating film was dried and compressed, and this was cut into a predetermined electrode size to produce a positive electrode in which positive electrode mixture layers were formed on both surfaces of the positive electrode current collector.

[Production of Negative Electrode]

Graphite, SBR, and sodium carboxymethyl cellulose (CMC-Na) were mixed at a solid content mass ratio of 100:1:1, and water was added in an appropriate amount to prepare a negative electrode mixture slurry. Subsequently, the negative electrode mixture slurry was applied to both surfaces of a negative electrode current collector composed of copper foil, the coating film was dried and compressed, and this was cut into a predetermined electrode size to produce a negative electrode in which negative electrode mixture layers were formed on both surfaces of the negative electrode current collector.

[Preparation of Non-Aqueous Electrolyte]

EC and EMC were mixed in a volume ratio of 3:7 (25° C., 1 atm). $LiPF_6$ was dissolved in the mixed solvent so as to obtain a concentration of 1 mol/L to prepare a non-aqueous electrolyte.

[Production of Test Cells]

The above positive electrode to which the aluminum lead was attached and the negative electrode to which the nickel lead was attached were spirally wound via a polyethylene separator to produce a wound electrode assembly. The electrode assembly was inserted into an exterior body being composed of an aluminum laminate sheet, the above non-aqueous electrolyte was injected, and then the exterior body was sealed to produce a test cell (non-aqueous electrolyte secondary battery).

Example 2

A positive electrode active material, a positive electrode, and a test cell were produced in the same manner as in Example 1 except that ammonium zirconium carbonate was used instead of ammonium carbonate. That is, an aqueous solution of ammonium zirconium carbonate was sprayed on the fired product without washing with water to perform heat treatment. The amount of ammonium zirconium carbonate added was adjusted to be 0.1 mol % in terms of Zr relative to the total number of moles of metal elements excluding Li in the composite oxide.

Example 3

A positive electrode active material, a positive electrode, and a test cell were produced in the same manner as in Example 2 except that the aqueous solution of ammonium carbonate was added and then the powder of tungsten oxide was added. The amount of tungsten oxide added was adjusted to be 0.1 mol % in terms of W relative to the total number of moles of metal elements excluding Li in the composite oxide.

Example 4

A positive electrode active material, a positive electrode, and a test cell were produced in the same manner as in Example 2 except that the aqueous solution of ammonium carbonate was added and then the aqueous solution of samarium sulfate was added. The amount of samarium sulfate added was adjusted to be 0.06 mol % in terms of Sm relative to the total number of moles of metal elements excluding Li in the composite oxide.

Example 5

A positive electrode active material, a positive electrode, and a test cell were produced in the same manner as in Example 2 except that a composite oxide represented by $LiNi_{0.82}Co_{0.15}Al_{0.03}O_2$ was used as the lithium-containing transition metal composite oxide.

Example 6

A positive electrode active material, a positive electrode, and a test cell were produced in the same manner as in Example 2 except that a composite oxide represented by $LiNi_{0.85}Co_{0.10}Mn_{0.05}O_2$ was used as the lithium-containing transition metal composite oxide.

Comparative Example 1

A positive electrode was produced in the same manner as in Example 1 except that the fired product without washing with water was used directly as the positive electrode active material.

Comparative Example 2

A positive electrode active material and a positive electrode were produced in the same manner as in Example 1 except that aqueous ammonia was sprayed on the fired product without washing with water and heating was performed at 200° C. for 2 hours.

Comparative Example 3

A positive electrode active material and a positive electrode were produced in the same manner as in Comparative Example 2 except that a liquid in which lithium carbonate had been dispersed was used instead of aqueous ammonia.

Comparative Example 4

A positive electrode active material, a positive electrode, and a test cell were produced in the same manner as in Comparative Example 2 except that not only aqueous ammonia but also a liquid in which lithium carbonate had been dispersed were sprayed.

Comparative Example 5

A positive electrode active material, a positive electrode, and a test cell were produced in the same manner as in Example 2 except that the aqueous solution of ammonium zirconium carbonate was adjusted to have an ammonia content of 240 ppm and to be 0.1 mol % in terms of Zr relative to a total number of moles of metal elements excluding Li in the composite oxide.

Comparative Example 6

A positive electrode active material, a positive electrode, and a test cell were produced in the same manner as in Comparative Example 1 except that a composite oxide represented by $LiNi_{0.82}Co_{0.15}Al_{0.03}O_2$ was used as the lithium-containing transition metal composite oxide.

Comparative Example 7

A positive electrode active material, a positive electrode, and a test cell were produced in the same manner as in Comparative Example 1 except that a composite oxide represented by $LiNi_{0.85}Co_{0.10}Mn_{0.05}O_2$ was used as the lithium-containing transition metal composite oxide.

A storage test (measurement of the amount of gas generated) was performed on each test cell of Examples and Comparative Examples, and the evaluation results are shown in Table 1.

[Storage Test (Measurement of Amount of Gas Generated)]

After charging to 4.2 V with a constant current of 0.1 C, constant voltage charging was performed at 4.2 V until the current value became equivalent to 0.01 C, and the charging was completed. After resting for 10 minutes, discharging was performed at a constant current of 0.1 C until the voltage reached 2.5 V. After performing the above charge and discharge for two cycles, the volume of the test cell that had been subjected to only charge for one cycle was measured by the buoyancy method (Archimedes method). The rest time between cycles was 10 minutes. The charged test cell was stored in a constant temperature bath at 85° C. for 3 hours. The temperature of the test cell after storage was lowered to room temperature, and then the volume was measured again by the buoyancy method. The difference between the volume before storage and the volume after storage was defined as the amount of gas generated, and was standardized per 1 g of the positive electrode active material. Table 1 shows the relative values of the amount of gas generated in each composition when the amount of each case without washing with water (Comparative Examples 1, 6, and 7) was set as 100 (relative values of Examples 1 to 4 and Comparative Examples 2 to 5 are those when the amount of Comparative Example 1 is 100, relative value of Example 5 is one when the amount of Comparative Example 6 is 100, and relative value of Example 6 is one when the amount of Comparative Example 7 is 100).

TABLE 1

| | Positive electrode active material | | | | | | |
|---|---|---|---|---|---|---|---|
| | | Surface coating material | | | Acid consumption X-(Y-X) mol/g | Acid consumption Y-X mol/g | Test cell Amount of gas generated at storage % |
| | Composite oxide | Element | Amount added mol % | Amount of ammonia ppm | | | |
| Comparative Example 1 | NCA 91/4.5/4.5 | — | — | 1 or less | 310 | 101 | 100 |
| Comparative Example 2 | | — | — | 120 | 280 | 120 | 99 |
| Comparative Example 3 | | — | — | 1 or less | 285 | 205 | 100 |
| Comparative Example 4 | | — | — | 120 | 280 | 210 | 97 |

TABLE 1-continued

| | Positive electrode active material | | | | | |
|---|---|---|---|---|---|---|
| | | Surface coating material | | Acid consumption X-(Y-X) mol/g | Acid consumption Y-X mol/g | Test cell Amount of gas generated at storage % |
| | Composite oxide | Element | Amount added mol % | Amount of ammonia ppm | | | |
| Comparative Example 5 | | Zr | 0.1 | 240 | 20 | 400 | 80 |
| Example 1 | | — | — | 120 | 45 | 215 | 35 |
| Example 2 | | Zr | 0.1 | 3 | 48 | 210 | 33 |
| Example 3 | | W | 0.1 | 120 | 48 | 210 | 34 |
| Example 4 | | Sm | 0.06 | 120 | 43 | 210 | 34 |
| Comparative Example 6 | NCA 82/15/3 | — | — | 1 or less | 200 | 80 | 100 |
| Example 5 | | Zr | 0.1 | 115 | 43 | 150 | 52 |
| Comparative Example 7 | NCM 85/10/5 | — | — | 1 or less | 110 | 30 | 100 |
| Example 6 | | Zr | 0.1 | 100 | 40 | 5 | 65 |

As shown in Table 1, each of the test cells of Examples has a smaller amount of gas generated at charge storage than the test cells of Comparative Examples. In addition, attaching Zr, W, Sm, and the like to the surface of the particles of the composite oxide further suppresses gas generation (refer to Examples 1, 2, and the like).

REFERENCE SIGNS LIST

10 non-aqueous electrolyte secondary battery, 11 positive electrode, 12 negative electrode, 13 separator, 14 electrode assembly, 15 battery case, 16 exterior can, 17 sealing assembly, 18, 19 insulating plate, 20 positive electrode lead, 21 negative electrode lead, 22 projecting portion, 23 filter, 24 lower vent member, 25 insulating member, 26 upper vent member, 27 cap, 28 gasket, 30 positive electrode current collector, 31 positive electrode mixture layer, 40 negative electrode current collector, 41 negative electrode mixture layer

The invention claimed is:

1. A positive electrode active material of a non-aqueous electrolyte secondary battery, comprising a lithium-containing transition metal composite oxide,
    wherein the lithium-containing transition metal composite oxide is secondary particles formed by aggregation of primary particles,
    when the positive electrode active material is added to an alkaline solution and then distilled, and the distillate is absorbed by sulfuric acid and subjected to ion chromatographic analysis, ammonia is detected in an amount of 2 to 200 ppm relative to the positive electrode active material, and
    when a filtrate of an aqueous dispersion prepared by dispersing 1 g of the positive electrode active material in 70 ml of pure water is titrated with hydrochloric acid, and an acid consumption up to a first inflection point of a pH curve is defined as X mol/g and an acid consumption up to a second inflection point is defined as Y mol/g, a value of Y−X is 50 to 300 mol/g and a value of X−(Y−X) is 150 mol/g or less.

2. The positive electrode active material of a non-aqueous electrolyte secondary battery according to claim 1,
    wherein at least one selected from a zirconium compound, a tungsten compound, a phosphorus compound, a boron compound, and a rare earth compound is attached to a surface of the primary particles.

3. The positive electrode active material of a non-aqueous electrolyte secondary battery according to claim 1,
    wherein the lithium-containing transition metal composite oxide contains nickel in an amount of 80% or more relative to a total number of moles of metal elements excluding lithium.

4. A positive electrode for a non-aqueous electrolyte secondary battery, comprising a positive electrode mixture layer comprising the positive electrode active material according to claim 1.

5. A non-aqueous electrolyte secondary battery, comprising:
    the positive electrode for a non-aqueous electrolyte secondary battery according to claim 4;
    a negative electrode;
    a separator; and
    a non-aqueous electrolyte.

6. The positive electrode active material of a non-aqueous electrolyte secondary battery according to claim 1,
    wherein the lithium-containing transition metal composite oxide contains nickel in an amount of greater than or equal to 91% and less than or equal to 95% relative to a total number of moles of metal elements excluding lithium.

* * * * *